(12) United States Patent
Wang et al.

(10) Patent No.: US 9,688,904 B2
(45) Date of Patent: *Jun. 27, 2017

(54) FRACTURING FLUIDS AND METHODS FOR TREATING HYDROCARBON-BEARING FORMATIONS

(71) Applicants: Xiaolan Wang, Spring, TX (US); Qi Qu, Spring, TX (US); Scott Nelson, Edmond, OK (US); Hong Sun, Houston, TX (US); Michael Guerin, Spring, TX (US)

(72) Inventors: Xiaolan Wang, Spring, TX (US); Qi Qu, Spring, TX (US); Scott Nelson, Edmond, OK (US); Hong Sun, Houston, TX (US); Michael Guerin, Spring, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 92 days.

This patent is subject to a terminal disclaimer.

(21) Appl. No.: 13/718,844

(22) Filed: Dec. 18, 2012

(65) Prior Publication Data

US 2014/0000896 A1 Jan. 2, 2014

Related U.S. Application Data

(63) Continuation-in-part of application No. 13/537,800, filed on Jun. 29, 2012.

(51) Int. Cl.
*C09K 8/62* (2006.01)
*C09K 8/68* (2006.01)
(Continued)

(52) U.S. Cl.
CPC ............. *C09K 8/62* (2013.01); *C09K 8/685* (2013.01)

(58) Field of Classification Search
CPC .. C09K 8/62; C09K 8/68; C09K 8/685; E21B 43/26
(Continued)

(56) References Cited

U.S. PATENT DOCUMENTS 3,370,650 A 2/1968 Watanabe
3,408,296 A 10/1968 Kuhn et al.
(Continued)

FOREIGN PATENT DOCUMENTS

CN 102952529 A 3/2013
EP 0280341 A1 8/1988
(Continued)

OTHER PUBLICATIONS

International Search Report and Written Opinion for International Application No. PCT/US2013/047449; International Filing Date Jun. 25, 2013; Issued Sep. 26, 2013 (13 pgs).
(Continued)

*Primary Examiner* — Zakiya W Bates
*Assistant Examiner* — Crystal J Miller
(74) *Attorney, Agent, or Firm* — Cantor Colburn LLP

(57) ABSTRACT

Disclosed herein is a fracturing fluid comprising a carrier fluid; a polymer that is soluble in the carrier fluid; the polymer being a synthetic polymer, wherein the synthetic polymer comprises a labile group that is operative to facilitate decomposition of the synthetic polymer upon activation of the labile group; the synthetic polymer being operative to increase the viscosity of the carrier fluid to about 5 to about 50 centipoise; the fracturing fluid being operative to reduce friction during a downhole fracturing operation and to transport a proppant during the downhole fracturing operation; and an oxidizing agent. A method for treating a hydrocarbon-bearing formation is also disclosed herein.

23 Claims, 7 Drawing Sheets

(51) Int. Cl.
*E21B 43/22* (2006.01)
*E21B 43/26* (2006.01)

(58) Field of Classification Search
USPC .......................................... 166/300; 507/225
See application file for complete search history.

(56) References Cited

U.S. PATENT DOCUMENTS

| | | | |
|---|---|---|---|
| 3,710,865 A | 1/1973 | Kiel | |
| 3,841,402 A * | 10/1974 | Knight | C09K 8/5083 |
| | | | 166/247 |
| 3,938,594 A | 2/1976 | Rhudy et al. | |
| 4,144,179 A * | 3/1979 | Chatterji | C09K 8/62 |
| | | | 106/198.1 |
| 4,463,810 A | 8/1984 | Hill | |
| 5,711,376 A | 1/1998 | Sydansk | |
| 6,042,936 A | 3/2000 | Kempf | |
| 6,454,008 B1 | 9/2002 | Chatterji et al. | |
| 6,720,290 B2 | 4/2004 | England et al. | |
| 6,734,146 B2 | 5/2004 | Chatterji et al. | |
| 6,767,868 B2 | 7/2004 | Dawson et al. | |
| 6,844,296 B2 | 1/2005 | Dawson et al. | |
| 6,986,391 B2 | 1/2006 | Funkhouser et al. | |
| 7,261,158 B2 | 8/2007 | Middaugh et al. | |
| 7,482,310 B1 | 1/2009 | Reese et al. | |
| 7,530,393 B2 | 5/2009 | Wood et al. | |
| 7,588,085 B2 | 9/2009 | Acock et al. | |
| 7,833,949 B2 | 11/2010 | Li et al. | |
| 7,857,055 B2 | 12/2010 | Li | |
| 8,022,015 B2 | 8/2011 | Carman et al. | |
| 2002/0169085 A1 | 11/2002 | Miller et al. | |
| 2003/0054962 A1 | 3/2003 | England et al. | |
| 2003/0092581 A1 | 5/2003 | Crews | |
| 2003/0207768 A1 | 11/2003 | England et al. | |
| 2005/0039919 A1 | 2/2005 | Harris et al. | |
| 2006/0185850 A1 | 8/2006 | Segura | |
| 2006/0254774 A1 | 11/2006 | Saini et al. | |
| 2007/0209794 A1 | 9/2007 | Kaufman et al. | |
| 2007/0209795 A1 | 9/2007 | Gupta | |
| 2008/0081771 A1 | 4/2008 | Lin et al. | |
| 2008/0099207 A1* | 5/2008 | Venditto | C09K 8/52 |
| | | | 166/308.3 |
| 2008/0289828 A1* | 11/2008 | Hutchins | C09K 8/68 |
| | | | 166/308.3 |
| 2009/0023613 A1 | 1/2009 | Li et al. | |
| 2009/0075845 A1 | 3/2009 | Abad et al. | |
| 2009/0105097 A1 | 4/2009 | Abad et al. | |
| 2009/0145607 A1* | 6/2009 | Li | C09K 8/685 |
| | | | 166/308.5 |
| 2010/0022418 A1 | 1/2010 | Milne et al. | |
| 2010/0089580 A1* | 4/2010 | Brannon | C09K 8/602 |
| | | | 166/280.2 |
| 2010/0222242 A1 | 9/2010 | Huang et al. | |
| 2011/0053812 A1 | 3/2011 | Ezell et al. | |
| 2011/0067875 A1 | 3/2011 | Funkhouser et al. | |
| 2011/0269651 A1* | 11/2011 | Bismarck | C04B 28/02 |
| | | | 507/225 |
| 2011/0269904 A1 | 11/2011 | Bismarck et al. | |
| 2012/0006551 A1 | 1/2012 | Carman et al. | |
| 2013/0048283 A1 | 2/2013 | Makarychev-Mikhailov et al. | |
| 2014/0005080 A1 | 1/2014 | Ogle et al. | |
| 2014/0251625 A1 | 9/2014 | Nelson | |

FOREIGN PATENT DOCUMENTS

| | | |
|---|---|---|
| WO | 0163090 A2 | 8/2001 |
| WO | 2009097286 A1 | 8/2009 |
| WO | 2011135313 A1 | 11/2011 |
| WO | 2011136679 A1 | 11/2011 |
| WO | 2012045155 A1 | 4/2012 |

OTHER PUBLICATIONS

International Search Report and Written Opinion for International Application No. PCT/US2013/047530; International filed Jun. 25, 2013; Issued Sep. 26, 2013 (12 pgs).
International Search Report dated Feb. 26, 2013 for International Application No. PCT/US2012/046460.
Written Opinion of the International Searching Authority mailed Jul. 12, 2012 for International Application No. PCT/US2012/046460.
Sun, H. et al. "A Novel Nondamaging Friction Reducer: Development and Successful Slickwater Frac Applications" Copyright 2010, Society of Petroleum Engineers; 9 pages.
International Search Report for International Application No. PCT/US2014/013565; International filing date Jan. 29, 2014; Issued May 26, 2014. (5 pgs).
Written Opinion for International Application No. PCT/US2014/013565; International filing date Jan. 29, 2014; Issued May 26, 2014. (8 pgs).
European Search Report, International Application No./Patent No. 12880043.0-1354/2867458, Date of Mailing Jan. 19, 2016, European Patent Office, European Search Report 11 pages.

* cited by examiner

FRACTURING FLUIDS AND METHODS FOR TREATING HYDROCARBON-BEARING FORMATIONS

CROSS-REFERENCE TO RELATED ART

This application claims priority to U.S. application Ser. No. 13/537,800, which was filed with the U.S. Patent and Trademark Office on Jun. 29, 2012, the entire contents of which are hereby incorporated by reference.

BACKGROUND

Hydraulic fracturing increases fluid (e.g., hydrocarbons, and the like) flow from a subterranean zone by creating new fractures and facilitating connectivity of the existing pores and natural channels contained in the subterranean zone. Hydraulic fracturing is a process by which cracks or fractures in the subterranean zone are created by pumping a fracturing fluid at a pressure that exceeds the parting pressure of the rock. The fracturing fluid creates or enlarges fractures in the subterranean zone and a particulate proppant material suspended in the fracturing fluid may be pumped into the created fracture. This process is also known as "frac-packing". The created fracture continues to grow as more fluid and proppant are introduced into the formation.

The proppants remain in the fractures in the form of a permeable "pack" that serves to hold open or "prop" the fractures open. After placement of the proppant materials, the fracturing fluid may be "broken" and recovered by using a breaker or a delayed breaker system to facilitate a reduction in the viscosity of the fracturing fluid. The reduction in fluid viscosity along with fluid leak-off from the created fracture into permeable areas of the formation allows for the fracture to close on the proppants following the treatment. By maintaining the fracture open, the proppants provide a highly conductive pathway for hydrocarbons and/or other formation fluids to flow into the borehole.

Slickwater fracturing is a type of treatment used in the stimulation of unconventional formations. Due to extremely low formation permeability, fluid leak-off is normally not of concern. During the slickwater hydraulic fracturing process, the pumping rate is generally very high to help facilitate the transport of proppants into the formation in conjunction with the use of the low viscosity fluid. At such fluid velocities the proppants in the fracturing fluids can be very abrasive, leading to reduced service life for fracturing equipment. In addition, friction between various components of the fracturing equipment can produce wear of the equipment. It is therefore desirable to reduce the wear on the equipment during fracturing. Guar is often used to increase the viscosity in fracturing fluids to reduce the amount of wear. Large amounts of guar in the form of a linear gel (non-crosslinked) are employed for this purpose.

A significant proportion of the total guar used in fracturing fluid operations is in the form of crosslinked fracturing fluids. For oil formations, in order to obtain the desired fracture width, higher viscosity fracturing fluids are employed. Consequently, higher loading of proppants are used to suitably prop open the relatively wide fractures. Fluids with low viscosity typically lack sufficient viscosity to carry such amounts of proppants, especially at high temperatures. Due to the costs associated with guar, it is not economical to obtain the desired high viscosity by simply increasing the concentration of the guar polymer. Overly concentrated guar fracturing fluids lead to adverse effects for the formation and proppant pack, i.e., formation or proppant pack damage, offsetting the benefit brought by the fracturing process. Thus, crosslinkers are widely used to promote crosslinking of the guar or guar-derived polymer by forming a three-dimensional (3D) network. The crosslinking agent increases the viscosity of the fracturing fluid such that the fracturing fluid has sufficient strength and viscosity to create or enlarge fractures and/or to carry the proppants during the course of the fracturing process, even at elevated temperatures. The recovery of the fracturing fluid is accomplished by using a breaker or a delayed breaker system to "break" the crosslinked guar polymers and reduce the viscosity of the fracturing fluid.

As a naturally occurring material, guar is a limited natural resource, the demand for which has increased greatly in recent years. In addition to significant supply limitations, guar-based fracturing fluids are also limited by other significant disadvantages, including but not limited to, the hydration limitations of the guar polymer, formation damage, i.e., undesirable coating of proppant materials and/or formation surfaces with the guar polymer or residue, and instability of the guar polymer at elevated temperatures in certain types of fracturing applications.

It is therefore desirable to provide an alternative to guar-based fracturing fluids, which solves one or more of the above problems associated with these guar-based fracturing fluids. It is also desirable to provide an alternative to guar-based fracturing fluids whereby the decomposition or the breaking of labile linkages therein can be facilitated, thereby lowering the viscosity and allowing for removal of the fracturing fluid.

SUMMARY OF THE DISCLOSURE

Disclosed herein is a fracturing fluid comprising a carrier fluid; a polymer that is soluble in the carrier fluid; the polymer being a synthetic polymer, wherein the synthetic polymer comprises a labile group that is operative to facilitate decomposition of the synthetic polymer upon activation of the labile group; the synthetic polymer being operative to increase the viscosity of the carrier fluid to about 5 to about 50 centipoise at 300 s'; the fracturing fluid being operative to reduce friction during a downhole fracturing operation and to transport a proppant during the downhole fracturing operation; and an oxidizing agent.

Disclosed herein too is a method for treating a hydrocarbon-bearing formation comprising blending a carrier fluid with a polymer to form a fracturing fluid, the fracturing fluid having a viscosity of about 5 to about 50 centipoise at 300 $s^{-1}$; the polymer being a synthetic polymer; discharging the fracturing fluid into a downhole fracture in the hydrocarbon-bearing formation, wherein the fracturing fluid is operative to reduce friction during a hydrocarbon-bearing treatment operation; and adding an oxidizing agent to the fracturing fluid.

BRIEF DESCRIPTION OF THE DRAWINGS

For a detailed understanding of the present disclosure, references should be made to the following detailed description, taken in conjunction with the accompanying drawings in which like elements have generally been designated with like numerals and wherein.

DESCRIPTION OF EMBODIMENTS

Figure 1:
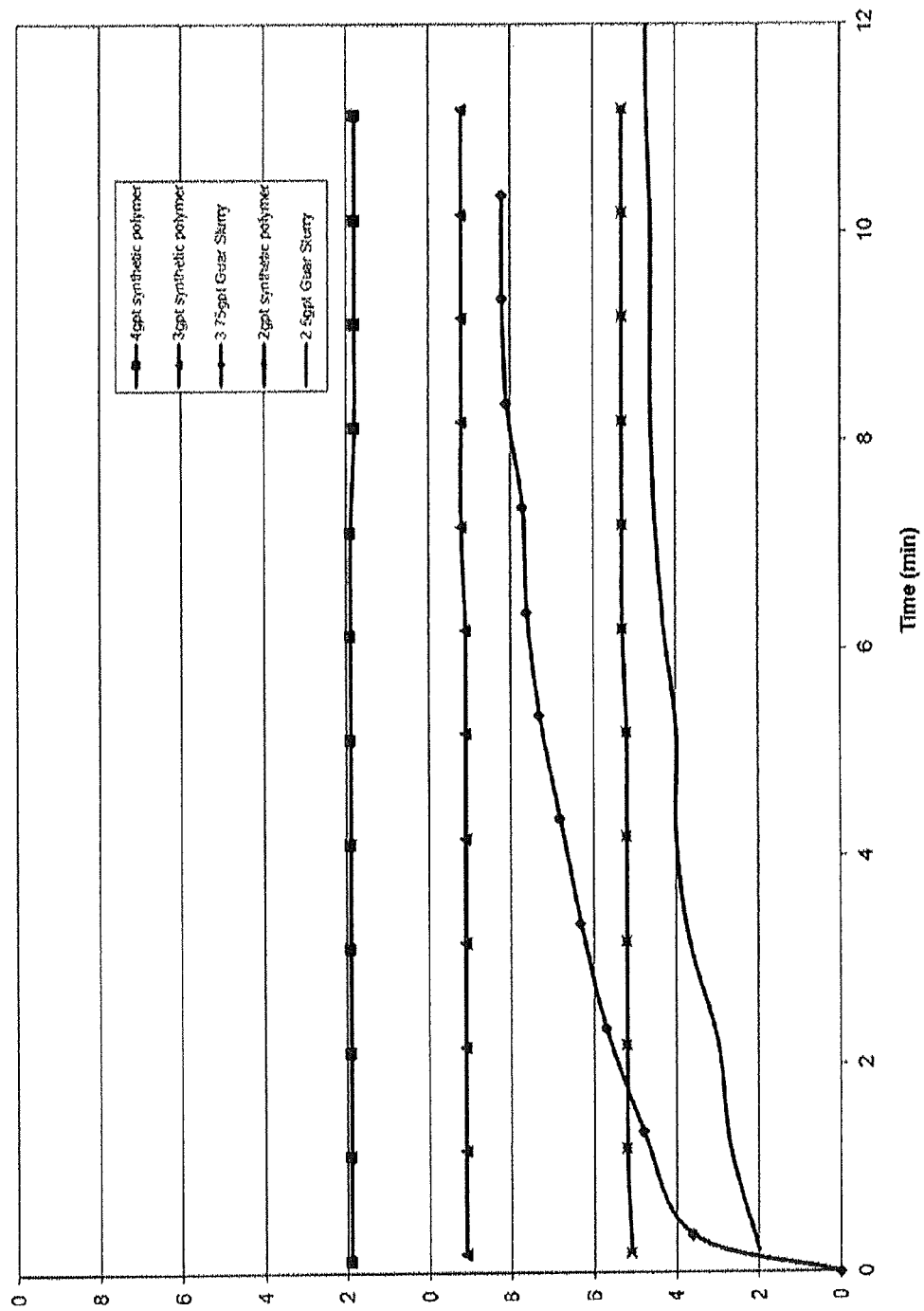
FIG. 1 is a graph depicting the dynamic hydration viscosity versus time for a) guar and b) the synthetic polymer at different concentrations in water.

Slickwater fracturing is a type of treatment used in the stimulation of unconventional formations. Due to extremely low formation permeability, fluid leak-off is normally not of concern, and therefore low viscosity fluids can be used for slickwater fracturing. During the slickwater fracturing process, the pumping rate is generally very high to help prevent settlement of the proppants in the fluid. When pumping at such a high rate or velocity, there is a high frictional pressure generated during the fluid flow in the surface pipes as well as inside the borehole. A high molecular weight synthetic polymer is added to the slickwater fracturing fluid as a friction reducer to reduce such fluid flow friction. The concentration of the synthetic polymer friction reducer is controlled such that the fluid viscosity is less than 2 centipoise (cP). Higher concentrations of the friction reducing polymer lead to a fluid viscosity of higher than 3 centipoise, often resulting in increased friction, which defies the purpose of using a friction reducer in slickwater fracturing applications. At such fluid velocities the proppants in the fracturing fluids can be very abrasive, leading to reduced service life for fracturing equipment. In addition, friction between various components of the fracturing equipment can produce wear of the equipment. Increasing the viscosity of the fracturing fluid by the addition of a polymer, even at relatively low viscosities, helps to make it possible to pump the fracturing fluid with reduced proppant settling and thus to lessen this abrasive effect and consequently to reduce friction and equipment wear.

Disclosed herein is a fracturing fluid that comprises a polymer and a carrier fluid. In one embodiment, the polymer is a synthetic polymer (i.e., it is a man-made polymer) and can rapidly dissolve, or hydrate, in the carrier fluid thereby increasing the viscosity of the carrier fluid so as to reduce friction between the various components of fracturing equipment used in the hydraulic fracturing process.

In an exemplary embodiment, the fracturing fluid reduces friction between components of the fracturing equipment during an early stage as well as during subsequent stages of dissolution of the polymer in the carrier fluid. It also prevents the proppants from settling out of the fracturing fluid (phase separating) during subsequent stages of dissolution of the polymer in the carrier fluid. The ability of the polymer to rapidly dissolve into the carrier fluid minimizes the use of pre-dissolution procedures and hydration equipment, thus reducing capital costs and maintenance costs. This rapid dissolution ability also permits the carrier fluid to transport proppants downhole while permitting them to remain slurried in the carrier fluid (i.e., with reduced settling or falling out of solution) while it is being transported to the fracture. In an exemplary embodiment, the fracturing fluid reaches its maximum viscosity within 10 to 40 seconds after introduction of the polymer into the carrier fluid, which allows slower settling of proppant within the fluids at lower pumping rate, and permits to reduce friction between the various components of the fracturing equipment.

The polymer is soluble in a carrier fluid, for example, an aqueous medium such as water or slickwater to form the fracturing fluid. In an exemplary embodiment, the polymer is an organic water-soluble synthetic polymer (i.e., it is a polymer that is man-made). In addition to the synthetic polymer, the polymer may comprise a naturally occurring polymer. A "naturally occurring" polymer is one that is derived from a living being such as an animal, a plant, a microorganism, or the like. The polymer can therefore comprise a naturally occurring polymer so long as it is blended with or copolymerized with the synthetic polymer.

In one embodiment, the polymer also comprises a labile group that can be decomposed upon activation. The decomposition of the labile group permits a reduction in the viscosity of the fracturing fluid and also permits its removal from the fracture after a conductive path is established through the proppants in the fracture. The conductive path permits the extraction of hydrocarbons from the fracture.

The polymer can comprise a blend of polymers, a copolymer, a terpolymer, an oligomer, a homopolymer, a block copolymer, an alternating block copolymer, a random copolymer, a random block copolymer, a graft copolymer, a star block copolymer, a dendrimer, an ionomer, an elastomer, a polyelectrolyte, or the like, or a combination comprising at least one of the foregoing polymers.

In one embodiment, the polymer may be a linear polymer, a branched polymer or a crosslinked polymer. In another embodiment, the polymer can comprise a blend of two or more synthetic polymers or a copolymer of two or more synthetic polymers. For example, the polymer can comprise a first synthetic polymer and a second synthetic polymer that are blended together or are that are copolymerized together. The copolymerization may involve covalent bonding and/or ionic bonding. In one embodiment, the first synthetic polymer is hydrophilic, while the second synthetic polymer is hydrophobic. In yet another embodiment, the polymer may comprise a copolymer of a synthetic polymer and a naturally occurring polymer, where the naturally occurring polymer can be either hydrophilic or hydrophobic.

In one embodiment, the polymer is a water soluble polymer. Examples of the water soluble polymer are polyacrylates, polyacrylamides, polyvinylacetates, polyvinyl acetamides, polyvinyl alcohols, neutralized and un-neutralized polymeric acids (e.g., neutralized and un-neutralized polyacrylics acids, neutralized and un-neutralized polysulfonic acids, neutralized and un-neutralized polystyrene sulfonic acids, or the like) polydiallyl dimethyl ammonium chlorides, poly(1-glycerol methacrylate)s, poly(2-dimethylaminoethyl methacrylate)s, poly(2-ethyl-2-oxazoline), poly(2-hydroxyethyl methacrylate/methacrylic acid)s, poly(2-hydroxypropyl methacrylate)s, poly(2-methacryloxyethyltrimethylammonium halide)s, poly(2-vinyl-1-methylpyridinium halide)s, poly(2-vinylpyridine N-oxide)s, poly(2-vinylpyridine)s, poly(3-chloro-2-hydroxypropyl-2-methacryloxyethyldimethylammonium chloride)s, or the like, or a combination comprising at least one of the foregoing water soluble polymers.

In one embodiment, the polymer can comprise one or more of the foregoing water soluble polymers and a synthetic polymer that is hydrophobic so long as the resulting polymer is soluble in the carrier fluid. In an exemplary embodiment, the polymer can comprise one or more of the foregoing water soluble polymers and a synthetic polymer that is hydrophobic so long as the resulting polymer is soluble in an aqueous carrier fluid. The foregoing water soluble polymers can be copolymerized or blended with the hydrophobic synthetic polymer.

Examples of hydrophobic synthetic polymers are polyacetals, polyolefins, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyethylene terephthalate, polybutylene terephthalate, polyurethane, polytetrafluoroethylene, polychlorotrifluoroethylene, polyvinylidene fluoride, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphtalides, polyacetals, polyanhydrides, polyvinyl ethers, polyvinyl thioethers, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, polyolefins, or the like, or a combination comprising at least one of the foregoing hydrophobic synthetic polymers.

As noted above, the polymer can comprise a blend or a copolymer of a synthetic polymer and a naturally occurring polymer. Examples of naturally occurring polymers include polysaccharides, derivatives of polysaccharides (e.g., hydroxyethyl guar (HEG), carboxymethyl guar (CMG), carboxyethyl guar (CEG), carboxymethyl hydroxypropyl guar (CMHPG), cellulose, cellulose derivatives (i.e., derivatives of cellulose such as hydroxyethylcellulose (HEC), hydroxypropylcellulose (HPC), carboxymethylcellulose (CMC), carboxyethylcellulose (CEC), carboxymethyl hydroxyethyl cellulose (CMHEC), carboxymethyl hydroxypropyl cellulose (CMHPC)), karaya, locust bean, pectin, tragacanth, acacia, carrageenan, alginates (e.g., salts of alginate, propylene glycol alginate, and the like), agar, gellan, xanthan, scleroglucan, or the like, or a combination comprising at least one of the foregoing.

The polymer comprises a labile group that is operative to facilitate decomposition of the polymer upon activation of the labile group. It is desirable for the labile group to be water soluble or otherwise soluble in the carrier fluid. Labile groups include ester groups, amide groups, carbonate groups, azo groups, disulfide groups, orthoester groups, acetal groups, etherester groups, ether groups, silyl groups, phosphazine groups, urethane groups, esteramide groups, etheramide groups, anhydride groups, and any derivative or combination thereof. In some embodiments, the labile links are derived from oligomeric or short chain molecules that include poly(anhydrides), poly(orthoesters), orthoesters, poly(lactic acids), poly(glycolic acids), poly(caprolactones), poly(hydroxybutyrates), polyphosphazenes, poly(carbonates), polyacetals, polyetheresters, polyesteramides, polycyanoacrylates, polyurethanes, polyacrylates, or the like, or a combination comprising at least one of the foregoing oligomeric or short chain molecules. In some embodiments, the labile links may be derived from a hydrophilic polymeric block comprising at least one compound selected from the group consisting of: a poly(alkylene glycol), a poly(alcohol) made by the hydrolysis of polyvinyl acetate), poly(vinyl pyrrolidone), a polysaccharide, a chitin, a chitosan, a protein, a poly(amino acid), a poly(alkylene oxide), a poly(amide), a poly(acid), a polyol, any derivative, copolymer, or combination thereof.

The polymer can be manufactured via emulsion (or inverse emulsion) polymerization to obtain high molecular weights. In emulsion polymerization or inverse emulsion polymerization, the polymers are suspended in a fluid. In one embodiment, the fluid in which the polymer is suspended is water. The manufacturing and use of the polymer in emulsion form makes it possible to be used as a liquid additive thereby simplifying it use in the fracturing fluid.

Depending on the particular labile group, the polymer can be degraded by oxidation, reduction, photo-decomposition, thermal decomposition, hydrolysis, chemical decomposition or microbial decomposition. The rates at which the polymer degrades is dependent on at least the type of labile group, composition, sequence, length, molecular geometry, molecular weight, stereochemistry, hydrophilicity, hydrophobicity, additives and environmental conditions such as temperature, presence of moisture, oxygen, microorganisms, enzymes, pH, and the like.

The synthetic polymer has a number average molecular weight of about 2,000,000 to about 20,000,000 specifically about 10,000,000 to about 18,000,000 grams per mole.

In an exemplary embodiment, the polymer (used in the fracturing fluid) is a linear synthetic polymer and comprises a polyacrylamide. Commercially available synthetic polymers are MaxPerm-20® and MaxPerm-20A® from Baker Hughes, Incorporated.

In an embodiment, the polymer is employed in an amount of about 0.01 to about 20 percent by weight (hereinafter "wt %"), specifically about 0.1 to about 10 wt %, and more specifically about 0.05 to about 5 wt %, based on the total weight of the fracturing fluid.

In one embodiment, it is desirable for the polymer to be soluble in an aqueous carrier fluid. When the polymer comprises a hydrophobic and a hydrophilic portion, it is desirable for the polymer to have an overall structure that lends itself to solubilization in an aqueous carrier fluid. In order to accomplish this, it is desirable for the polymer to have a solubility parameter that is proximate to that of the carrier fluid so that the polymer can rapidly dissolve in the carrier fluid.

The selection of the chemical constituents of the polymer used in a given fracturing application is determined, in part, using the solubility parameter of the chemical constituents. The Hildebrand solubility parameter is a numerical parameter, which indicates the relative solvency behavior of a polymer or a combination of polymers in a specific solvent. Here, the solvent is the carrier fluid. The solubility parameter is derived from the cohesive energy density of the polymer. From the heat of vaporization in calories per cubic centimeter of liquid, the cohesive energy density (c) can be derived by the following equation (1):

$$c = \frac{\Delta H - RT}{V_m} \quad (1)$$

where c=cohesive energy density; ΔH=heat of vaporization, R=gas constant, T=temperature; and $V_m$=molar volume. In general terms, when two materials having similar cohesive energy density values, the solubility parameter values are proximate to each other, since the solubility parameter is the square root of the cohesive energy density. Two materials are considered to be miscible with one another when they have similar solubility parameters. By tailoring the polymer structure (i.e., by combining the appropriate amount of a hydrophillic polymer with a hydrophobic polymer) the solubility parameter of the polymer can be tailored to be proximate to that of a particular carrier fluid.

In metric units, the solubility parameter (δ) can be calculated in calories per cubic centimeter in metric units ($cal^{1/2}cm^{-3/2}$). In SI units, the solubility parameter is expressed is megapascals ($MPa^{1/2}$). The conversion of the solubility parameter from SI units to metric units is given by the equation (2):

$$\delta\ (MPa^{1/2}) = 2.0455 \times \delta\ (cal^{1/2}cm^{-3/2}) \quad (2)$$

The solubility parameter can be used to predict the solvency of a particular combination of polymers (i.e., copolymers or blends of polymers) in a solvent. A solvent will generally swell the polymer when the solubility parameter is proximate to that of the polymer. The solubility parameter of the polymer can be calculated based on the relative weight fractions of each constituent of the polymer according to equation (3):

$$\delta_{polymer} = w_1\delta_1 + w_2\delta_2 \quad (3)$$

where $\delta_{polymer}$ is the solubility parameter of the copolymer or blend of polymers, $\delta_1$ is the solubility parameter the hydrophilic polymer, $w_1$ is the weight fraction of the hydrophilic polymer, $\delta_2$ is the solubility parameter of the hydrophobic polymer and $w_2$ is the weigh fraction of the hydrophobic polymer. In one embodiment, the solubility parameter of the carrier fluid can be tailored to be proximate to that of the combination of polymers if so desired.

In an embodiment, the solubility parameter of the polymer is within about 25% of the solubility parameter of the carrier fluid. In another embodiment, the solubility parameter of the synthetic polymer is within about 20% of the solubility parameter of the carrier fluid.

The carrier fluid solvates the polymer and in addition transports the proppant materials downhole to the hydrocarbon bearing formation. The carrier fluid is a liquid carrier that is generally suitable for use in hydrocarbon (i.e., oil and gas) producing wells. In an embodiment, the carrier fluid is an aqueous solution. In another embodiment, the carrier fluid may be slickwater. Slickwater, for example, has a viscosity of less than 3 centipoise. Water is generally a major component by total weight of the carrier fluid. The water is potable, i.e., drinkable, or non-potable. In an embodiment, the water is brackish or contains other materials that may be present in water found in or near oil fields. In another embodiment, the carrier fluid comprises a salt such as an alkali metal or alkali earth metal salt (e.g., $NaCO_3$, NaCl, KCl, $CaCl_2$, and the like) in an amount of from about 0.1 wt % to about 10 wt %, based on the total weight of the carrier fluid. In still yet another embodiment, the carrier fluid is recycled fracturing fluid water or its residue.

In an embodiment, the fracturing fluid is a slurry, a gel, an emulsion or foam, e.g., hydrogel. As used herein, the term "emulsion" refers to a mixture of two or more normally immiscible liquids which results in a two-phase colloidal system wherein a liquid dispersed phase is dispersed in a liquid continuous phase. In an embodiment, the fracturing fluid is an oil-in-water emulsion. As used herein, the term "slurry" refers to a thick suspension of solids in a liquid. As used herein, the term "gel" refers to a solid, jelly-like material. In one embodiment, gels are mostly liquid. Their solid-like behavior is the result of the formation of a three-dimensional crosslinked network within the liquid wherein the liquid molecules are dispersed in a discontinuous phase within a solid continuous phase. In one embodiment, the fracturing fluid is a slurry or a gelled slurry.

The fracturing fluid generally comprises the carrier fluid in an amount of about 95 to about 99.9 wt %, based upon the total weight of the fracturing fluid. In an exemplary embodiment, the fracturing fluid comprises the carrier fluid in an amount of about 99 to about 99.5 wt %, based upon the total weight of the fracturing fluid.

In an embodiment, the fracturing fluid further comprises a proppant, i.e., proppant materials or particulate materials, which is carried into the hydrocarbon formation by the fracturing fluid and remain in the fracture created, thus propping open the fracture when the fracturing pressure is released and the well is put into production. Examples of proppant materials include sand, resin coated sands, plastic or plastic composite such as a thermoplastic or thermosetting composite or a resin or an aggregate containing a binder, walnut shells, sintered bauxite, glass beads, ceramic materials, synthetic organic particles such as, for example, nylon pellets, naturally occurring materials, or the like, or a combination comprising at least one of the foregoing proppant materials. Suitable proppants further include those set forth in U.S. Patent Publication No. 2007/0209794 and U.S. Patent Publication No. 2007/0209795, herein incorporated by reference.

The fracturing fluid generally comprises the proppant in an amount of about 1% to about 60 wt %, specifically about 1% to about 40 wt %, based upon the total weight of the fracturing fluid.

As noted above, the polymer may be crosslinkable. In an embodiment, the polymer is crosslinked during a fracturing operation. In another embodiment, the polymer is a co-polymer with cross-linkable monomers. Crosslinking the fracturing fluid further increases the viscosity of the carrier fluid, traps proppant materials and prevents settling of proppant materials.

Any suitable crosslinking agent is used to crosslink the polymer. Non-limiting examples of crosslinking agents include crosslinking agents comprising a metal such as boron, titanium, zirconium, calcium, magnesium, iron, chromium and/or aluminum, as well as organometallic compounds, complexes, ions or salts thereof, or a combination comprising at least one of the foregoing. Non-limiting examples of such metal-containing crosslinking agents include: borates, divalent ions such as $Ca^{2+}$, $Mg^{2+}$, $Fe^{2+}$, $Zn^{2+}$ and salts thereof; trivalent ions such as $Al^{3+}$, $Fe^{3+}$ and salts thereof; metal atoms such as titanium or zirconium in the +4 oxidation (valence) state. Crosslinking increases the molecular weight and is particularly desirable in high-temperature wells to avoid decomposition, or other undesirable effects of high-temperature applications.

In an embodiment, the crosslinking agent is included in the fracturing fluid in an amount of from about 0.01 wt % to about 2.0 wt %, specifically about 0.02 wt % to about 1.0 wt % of the fracturing fluid, based on the total weight of the fracturing fluid.

In an embodiment, the crosslinked fracturing fluid has a viscosity of about 200 to about 3000 centipoise at 100 s$^-$, specifically about 300 to about 2500 centipoise at 100 s$^{-1}$, and more specifically about 300 to about 1200 centipoise at 100 s$^{-1}$.

In an embodiment, the fracturing fluid further comprises a breaking agent to activate the labile group and facilitate decomposition of the polymer. Breaking agents "break" or diminish the viscosity of the fracturing fluid so that the fracturing fluid is more easily recovered from the formation during cleanup, e.g., using flowback. Breaking agents include oxidizing agents (or oxidizers), reducing agents, enzymes, or acids. Breaking agents reduce the polymer's molecular weight by the action of an acid, an oxidizer, an enzyme, or some combination of these on the polymer itself. Non-limiting examples of breaking agents include persulfates such as ammonium persulfate, sodium persulfate, potassium persulfate, bromates such as sodium bromate and potassium bromate, periodates, peroxides such as calcium peroxide, hydrogen peroxide, bleach, sodium perchlorate and organic percarboxylic acids or sodium salts, organic materials such as enzymes, or the like; chlorites, or the like, or a combination comprising at least one of the foregoing breaking agents. Breaking agents can be introduced into the fracturing fluid in live form or in encapsulated form.

In one embodiment, the breaking agent comprises an oxidizing agent and a reducing agent. The oxidizing agent facilitates the decomposition of the polymer with a consequent reduction in viscosity of the fracturing fluid. The reducing agent accelerates the decomposition rate of the polymer beyond the rate facilitated by a breaking agent that comprises only an oxidizing agent. By varying the ratio of the oxidizing agent and the reducing agent, the rate of decomposition of the polymer can be controlled. In one embodiment, by varying the rate of addition of the oxidizing agent and/or the reducing agent to the hydrocarbon formation over time, the rate of decomposition of the polymer and the rate of viscosity reduction of the fracturing fluid in the hydrocarbon formation may be adjusted. The use of both an oxidizing agent and a reducing agent in a breaking agent thus permits greater control over the viscosity reduction characteristics of a fracturing fluid that contains only the oxidizing agent or the reducing agent. In this way, rapid and easy adjustments of the fluid viscosity of the synthetic polymer may be made.

The oxidizing agent promotes decomposition of the labile group of the synthetic polymer. Examples of the oxidizing agent include any of the foregoing breaking agents, earth metal alkali oxidizing compounds, brominated or bromate oxidizing compounds such as sodium bromate, or a combination comprising at least one of the foregoing. In an embodiment, the oxidizing agent is effective to break or degrade the fracturing fluid at downhole or application temperatures greater than or equal to about 275° F., specifically at temperatures of about 275° F. to about 400° F. In an exemplary embodiment, the oxidizing agent is sodium bromate.

In an embodiment, only the oxidizing agent is included in the fracturing fluid in an amount of from about 0.001 wt % to about 0.5 wt %, specifically from about 0.005 wt % to about 0.2 wt %, more specifically from about 0.02 wt % to about 0.12 wt %, based on the total weight of the fracturing fluid.

In one embodiment, the fracturing fluid further comprises a reducing agent. As noted above, the reducing agent accelerates the rate of decomposition of the polymer thus bringing about a more rapid reduction in viscosity of the fracturing fluid. Examples of the reducing agent include sodium erythorbate, iron sulfate, oxalic acid, formic acid, ascorbic acid, erythorbic acid, a compound comprising a metal ion wherein the metal ion is a copper ion, an iron ion, a tin ion, a manganese ion or a sulfur ion such as thioglycol or a combination comprising at least one of the foregoing. In one embodiment, a fracturing fluid that contains both an oxidizing agent and a reducing agent reduces the temperature of decomposition of the polymer to a much lower temperature than that which would be accomplished by a fracturing fluid that contains either an oxidizing agent or a reducing agent.

In an embodiment, the reducing agent, in combination with the oxidizing agent, is effective to break, or degrade, the synthetic polymer in the fracturing fluid at downhole or application temperatures of less than or equal to about 275° F., specifically about 200° F. to about 275° F. When both an oxidizing agent and a reducing agent are used in the fracturing fluid, the amount of the oxidizing agent is reduced relative to the amount of oxidizing agent used in a fracturing fluid that contains only the oxidizing agent and not the reducing agent.

When both the oxidizing agent and the reducing agent are present in the fracturing fluid, the oxidizing agent is included in the fracturing fluid in an amount of from about 0.001 wt % to about 0.5 wt %, specifically from about 0.005 wt % to about 0.2 wt %, more specifically from about 0.02 wt % to about 0.12 wt %, based on the total weight of the fracturing fluid.

In an embodiment, the reducing agent is included in the fracturing fluid in an amount of from about 0.0006 wt % to about 0.12 wt %, specifically about 0.001 wt % to about 0.06 wt %, more specifically about 0.002 wt % to about 0.012 wt %, based on the total weight of the fracturing fluid. In another embodiment, the weight ratio of the oxidizing agent to the reducing agent is about 0.1:1 to about 100:1, specifically about 1:1 to about 20:1, more specifically about 4:1 to about 12:1.

In an embodiment, the breaking agent is used to activate the controlled decomposition of the polymer. In an embodiment, the breaking agent is added to the fracturing fluid to instantly begin reducing the viscosity of the fracturing fluid. In another embodiment, the breaking agent is already present in the fracturing fluid and is activated by some external or environmental condition. In an embodiment, an oilfield breaking agent is used to break the fracturing fluid using elevated temperatures downhole. For example, the breaking agent may be activated at temperatures of 50° C. or greater.

In an embodiment, the fracturing fluid further comprises other additives as desired and needed depending upon the particular conditions of the fracturing operation. Non-limiting examples of such additives include pH agents, buffers, mineral, oil, alcohol, biocides, clay stabilizers, surfactants, viscoelastic surfactants, emulsifiers, non-emulsifiers, scale-inhibitors, fibers, fluid loss control agents and combinations comprising at least one of the foregoing additives.

In an exemplary embodiment, the fracturing fluid further may comprise other additives as desired for a particular application. Examples of such additives include, but are not limited to, any of the foregoing additives, clay control agents, one or more of the foregoing crosslinking agents, buffers, and breaker catalysts.

A clay control agent is used to control and prevent clay swelling. Examples of clay control agents include ammonium chloride, tetramethyl ammonium chloride and diallyl dimethyl ammonium chloride.

In an embodiment, the clay control agent is included in the fracturing fluid in an amount of from about 0.01 wt % to about 2 wt %, specifically about 0.02 wt % to about 1 wt %, more specifically about 0.05 wt % to about 0.1 wt %, based on the total weight of the fracturing fluid.

A breaker catalyst is used to catalyze, or activate, the breaking or oxidizing agent. An example of a breaker catalyst is acetyl triethyl citrate.

In an embodiment, the breaker catalyst is included in the fracturing fluid in an amount of from about 0.0011 wt % to about 1.1 wt %, specifically about 0.011 wt % to about 0.55 wt %, more specifically about 0.022 wt % to about 0.22 wt %, based on the total weight of the fracturing fluid.

A buffer is used to maintain the pH of the fracturing fluid. Examples of buffers include formic acid and acetic acid.

In an embodiment, the buffer is included in the fracturing fluid in an amount of from about 0.001 wt % to about 1 wt %, specifically about 0.01 wt % to about 0.5 wt %, more specifically about 0.05 wt % to about 0.2 wt %, based on the total weight of the fracturing fluid.

In one embodiment, in one method of manufacturing the fracturing fluid, the polymer is dissolved into the carrier fluid in an amount effective to increase the viscosity of the carrier fluid. Other additives such as the proppant, surfactants, breaking agents, and the like, may be present in the carrier fluid either prior to the addition of the polymer or may be added to the carrier fluid after the addition of the polymer. The polymer rapidly dissolves into the carrier fluid increasing its viscosity. The increase in viscosity indirectly reduces friction between components of the fracturing equipment and reduces settling of the proppants in the carrier fluid as the fracturing fluid travels to the fracture in the subterranean zone.

In an embodiment, the viscosity of the carrier fluid is increased by about 100% to about 900% in about 10 to about 100 seconds upon introduction of the polymer to the carrier fluid. In another embodiment, the viscosity of the carrier fluid is increased by about 500% to about 800% in about 20 to about 90 seconds upon introduction of the polymer to the carrier fluid. In yet another embodiment, the viscosity of the carrier fluid is increased by about 550% to about 750% in about 70 to about 100 seconds upon introduction of the polymer to the carrier fluid.

In an embodiment, the fracturing fluid, in an uncrosslinked state or prior to crosslinking, has a viscosity of about 5 to about 50 centipoise, specifically about 6 to about 30 centipoise, and more specifically about 7 to about 20 centipoise, upon introduction of the polymer to the carrier fluid. In another embodiment, the viscosity of the carrier fluid begins increasing upon introduction of the synthetic polymer to the carrier fluid. Although not wishing to be bound by theory, it is thought that the polymer increases the viscosity of the carrier fluid due to not only the molecular weight and structure of the polymer itself but also due to the formation of a network of physical bonds (e.g., hydrogen bonds or ionic bonds) between the polymers, resulting in a gel-like fluid, without crosslinking.

In one method of using the fracturing fluid, the polymer is added to the carrier fluid and undergoes rapid dissolution upon contacting the carrier fluid. The fracturing fluid is pumped downhole almost as soon as the polymer is introduced into the carrier fluid. Because the polymer undergoes rapid hydration upon introduction into the carrier fluid, the fracturing fluid is immediately pumped downhole. The rapid hydration of the polymer by the carrier fluid promotes an increase in the viscosity of the fracturing fluid as it is pumped thereby reducing friction between the various mechanical components (e.g., components of the drilling and fracturing equipment) as it travels downhole. As the fracturing fluid travels downhole, the increase in viscosity of the fracturing fluid allows the fracturing fluid to be pumped at a lower rate without significant settling of the proppants.

The fracturing fluid generally reaches its maximum viscosity when it penetrates the fracture. Once in the fracture, the proppants present in the fracturing fluid are disposed in the fracture and are used to prop open the fracture. When the fracture is supported by the proppants, the labile groups in the fracturing fluid are activated to decompose the polymer in the fracturing fluid. The breaking agent comprising the oxidizing agent and the reducing agent facilitate the decomposition of the polymer. In one embodiment the oxidizing agent and the reducing agent are simultaneously added to the fracturing fluid after the polymer has crosslinked. In another embodiment, the oxidizing agent is first added to the fracturing fluid followed by the reducing agent. In yet another embodiment, the oxidizing agent and the reducing agent are added sequentially in an alternating fashion to facilitate decomposition control and viscosity control. In still yet another embodiment, the crosslinking agent and the oxidizing agent and/or reducing agent are added sequentially in an alternating fashion to facilitate crosslinking control and decomposition and viscosity control. The decomposition of the fracturing fluid causes a reduction in its viscosity, which permits its removal from the fracture. The removal of the fracturing fluid from the fracture leaves behind a conductive path way in the proppants through which hydrocarbons may be removed from the fracture.

The polymer used in the fracturing fluid has a number of advantages over other commercially available polymers that are presently used in fracturing fluids. Since the polymer is synthetic (i.e., man-made) is not subject to some of the production constraints of naturally occurring polymers. It undergoes rapid dissolution when mixed with the carrier fluid. It exhibits a maximum viscosity at ambient temperature of equal to or greater than about 8 centipoise after about 30 seconds following the introduction of the polymer into the carrier fluid. The ability of the polymer to rapidly dissolve in the carrier fluid causes the fracturing fluid to reach about 85% or greater of the maximum viscosity at about 45° F. after about 15 seconds.

In another embodiment, the fracturing fluid comprises a breaking agent, which will break the polymer chains and significantly reduce the fluid viscosity to less than 10 centipoise at temperature equal to or above 100° F.

In another embodiment, in one method for treating a hydrocarbon-bearing formation the carrier fluid is blended with a synthetic polymer to form a fracturing fluid, where the fracturing fluid has a viscosity of about 5 to about 50 centipoise. Following the blending, the fracturing fluid is discharged into a downhole fracture in the hydrocarbon-bearing formation. The fracturing fluid acts to reduce friction between components of the drilling and fracturing equipment during a hydrocarbon-bearing treatment operation. In an embodiment, the carrier fluid is discharged into the hydrocarbon-bearing formation, i.e., downhole, and the synthetic polymer and optional additives are introduced into the carrier fluid downhole.

The invention is further described by the following non-limiting examples.

EXAMPLES

Example 1

This example was conducted to show the rapid hydration of the polymer when compared with guar which is a commercially available naturally occurring polymer. In this example, hydraulic fracturing fluids comprising the synthetic polymer disclosed herein were compared with hydraulic fracturing fluids that use guar (a naturally occurring polymer). The polymer is a synthetic polymer and comprises a polyacrylamide. It is commercially available as MaxPerm-20® from Baker Hughes, Incorporated. The carrier fluid is water.

For this example, the synthetic polymer MaxPerm-20® was dissolved in water as shown in the Table 1 and viscosity measurements were made. The viscosity measurements were made at ambient temperature using an Ofite rheometer at 300 revolutions per minute (rpm) and performed according to American Petroleum Institute standard API RP-39. The viscosity results are provided in the Table 1 and in the FIG. 1. The comparative samples contain guar dissolved in water. These results are also provided in the Table 1 and in the FIG. 1. The FIG. 1 is a graph of viscosity (in centipoise) measured at 300 rpm versus time (in minutes) for the respective samples.

In the Table 1, Samples 1 and 2 are comparative examples that contain 2.5 gpt (gallons per thousand) and 3.75 gpt guar slurry respectively. Samples 3, 4 and 5 are examples that display the viscosity properties of samples that contain 2, 3 and 4 gpt respectively of the synthetic polymer MaxPerm-20®. From Table 1 and FIG. 1 it may be seen that the synthetic polymer reaches a maximum viscosity at lower loading levels than the guar.

TABLE 1

| Sample # | Composition | Viscosity (cP) | Hydration time to maximum viscosity |
|---|---|---|---|
| 1* | 2.5 gpt guar (10 ppt guar) | 4.7 | ~8.25 minutes |
| 2* | 3.75 gpt (15 ppt guar) | 8.2 | 10 minutes |
| 3 | 2 gpt MaxPerm-20 | 5.3 | Less than 30 seconds |
| 4 | 3 gpt MaxPerm-20 | 9 | Less than 30 seconds |
| 5 | 4 gpt MaxPerm-20 | 11 | Less than 30 seconds |

*Comparative Examples

For example, in comparing Sample #2 with Sample #4, it may be seen that a concentration of 3.75 gpt of guar (in water) produces a maximum viscosity of 8.2 centipoise, while 3 gpt of the synthetic polymer (in water) produces a maximum viscosity of 9 centipoise. In addition, it may be seen that while the guar takes about 8 to 10 minutes to undergo hydration, the synthetic polymer undergoes hydration in less than 30 seconds. Thus, fracturing fluids using the synthetic polymer described herein demonstrate a much more rapid hydration in much less time than the guar-based comparative fracturing fluid.

Example 2

This example was conducted to demonstrate the dynamic hydration properties of the synthetic polymer. This polymer used in this example is the synthetic polymer MaxPerm-20®. The carrier fluid was water.

Figure 2:
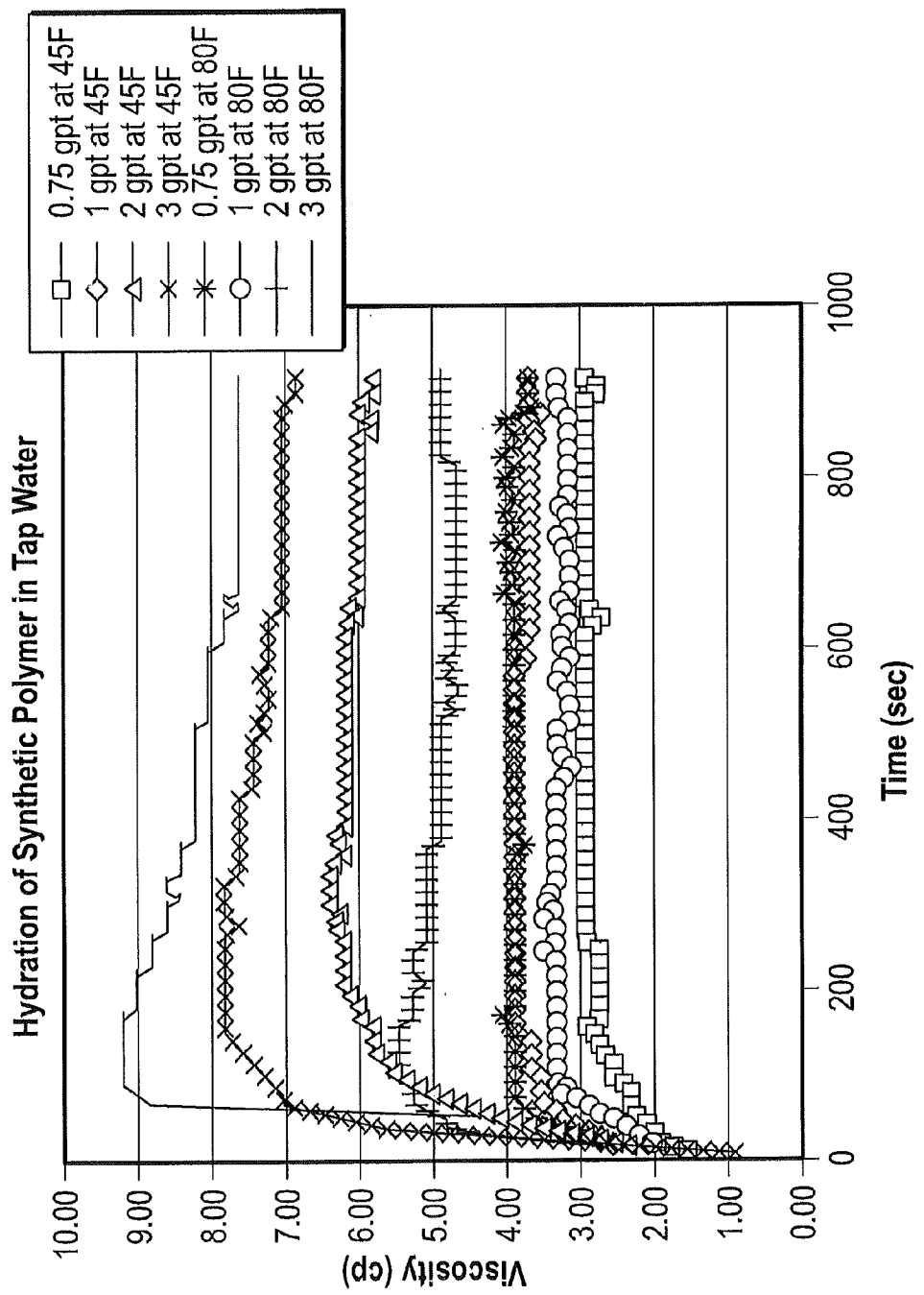
FIG. 2 is a graph depicting the dynamic hydration viscosity at temperatures of 45° F. and 80° F. versus time for the synthetic polymer in water.

In this example, the viscosity was measured upon the introduction of different amounts of the synthetic polymer to the water. The viscosity thus measured during the hydration of the synthetic polymer by water. The resulting viscosity is therefore a measure of dynamic hydration of the synthetic polymer by water. The polymer was dissolved in the water at 45° F. (7.2° C.) and 80° F. (26.6° C.), during which the viscosity was measured. The results are shown in the FIG. 2. The FIG. 2 is a graph depicting the dynamic hydration viscosity at temperatures of 45° F. and 80° F. versus time for the synthetic polymer in water. The concentration of the polymer in the water at each of the foregoing temperatures was 0.75 gpt, 1 gpt, 2 gpt or 3 gpt respectively.

From the FIG. 2 it may be seen that synthetic polymer hydrates rapidly in the water in a time period of less than 200 seconds irrespective of the temperature or the concentration. For each concentration, the fracturing fluid reaches a 85% of the maximum viscosity attainable within about 40 seconds of the introduction of the synthetic polymer into the water.

Example 3

This example was conducted to evaluate possible formation damage from the use of the synthetic polymer in a fracturing fluid and to compare it with the damage caused by the use of guar in a comparative fracturing fluid. In this example, the permeability of a simulated fracture surface comprising 81% quartz, 2% K-feldspar, and 11% MILIS is first measured. The simulated fracture surface is then contacted with the respective fracturing fluid (i.e., a fracturing fluid comprising the synthetic polymer MaxPerm-20® or a comparative fracturing fluid comprising linear guar). The fracturing fluid was then oxidized, decomposed and removed from the simulated fracture surface following which the permeability of the simulated fracture surface is once again measured. The difference between the initial permeability and the final permeability is a measure of the formation damage that the polymer imparts to the fracture surface. The gas used to check the permeability is nitrogen. It is generally desirable for this damage to be as little as possible. In short, it is desirable that the initial permeability of the simulated fracture surface be almost the same values as the permeability of the simulated fracture surface after the fracturing fluid is removed from contact with the simulated fracture surface.

In this example, the synthetic polymer (MaxPerm-20®) and the comparative polymer (guar) were each separately dissolved in a carrier fluid to form the fracturing fluid. Added to these fracturing fluids is an oxidizer to break down the fracturing fluid after it contacts the simulated fracture surface. The respective fracturing fluids contact the simulated fracture surface at 180° F. (82.22° C.) under an injection pressure of 60 psi (pounds per square inch) (4.2 kilograms per square centimeter ($kg/cm^2$)) and a confining pressure of 1,500 psi (105.46 $kg/cm^2$) for period of 20 hours. After the confining period of 20 hours, the oxidizer was activated to decompose the respective polymers and the fracturing fluid was removed from contact with the simulated fracture surface. The permeability of the simulated fracture surface was measured before and after contact with the respective fracturing fluids and the results are shown in the FIGS. 3 and 4 for the fracturing fluid containing the synthetic polymer and the guar respectively.

Figure 3:
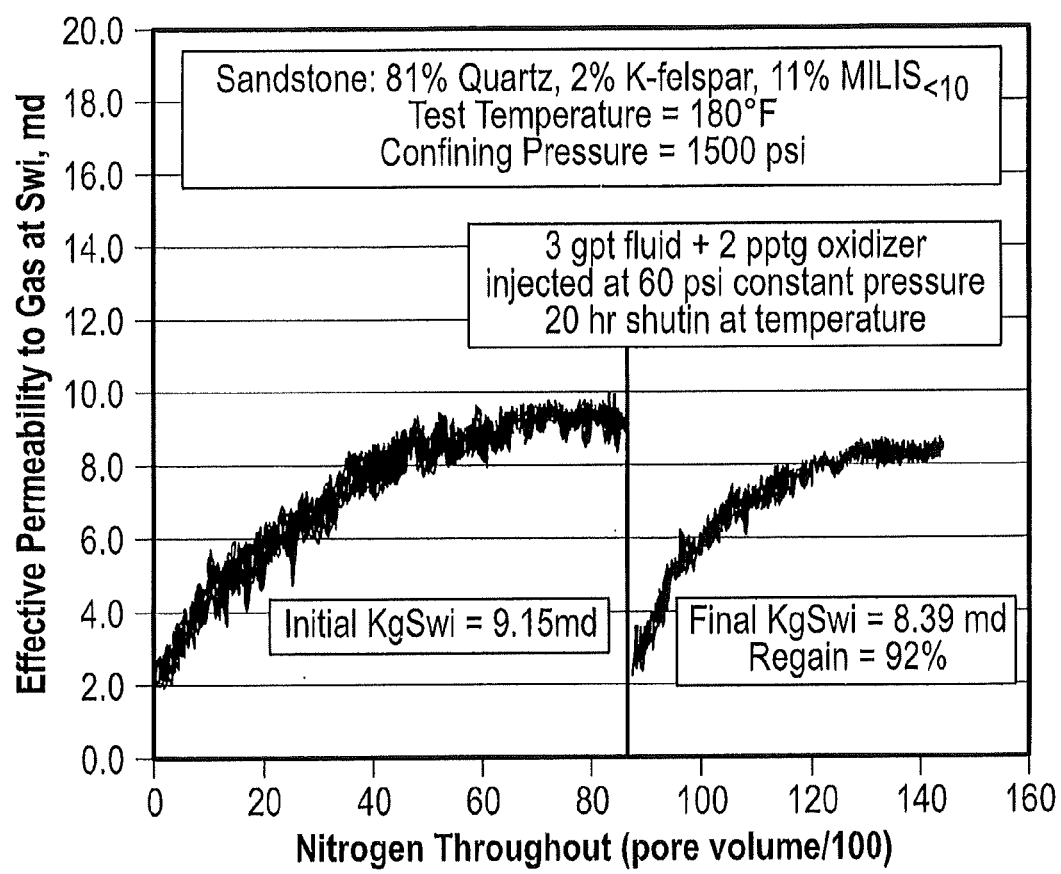
FIG. 3 is a graph depicting the effective permeability of a simulated fracture surface when contacted with a fracturing fluid that contains the synthetic polymer.
Figure 4:
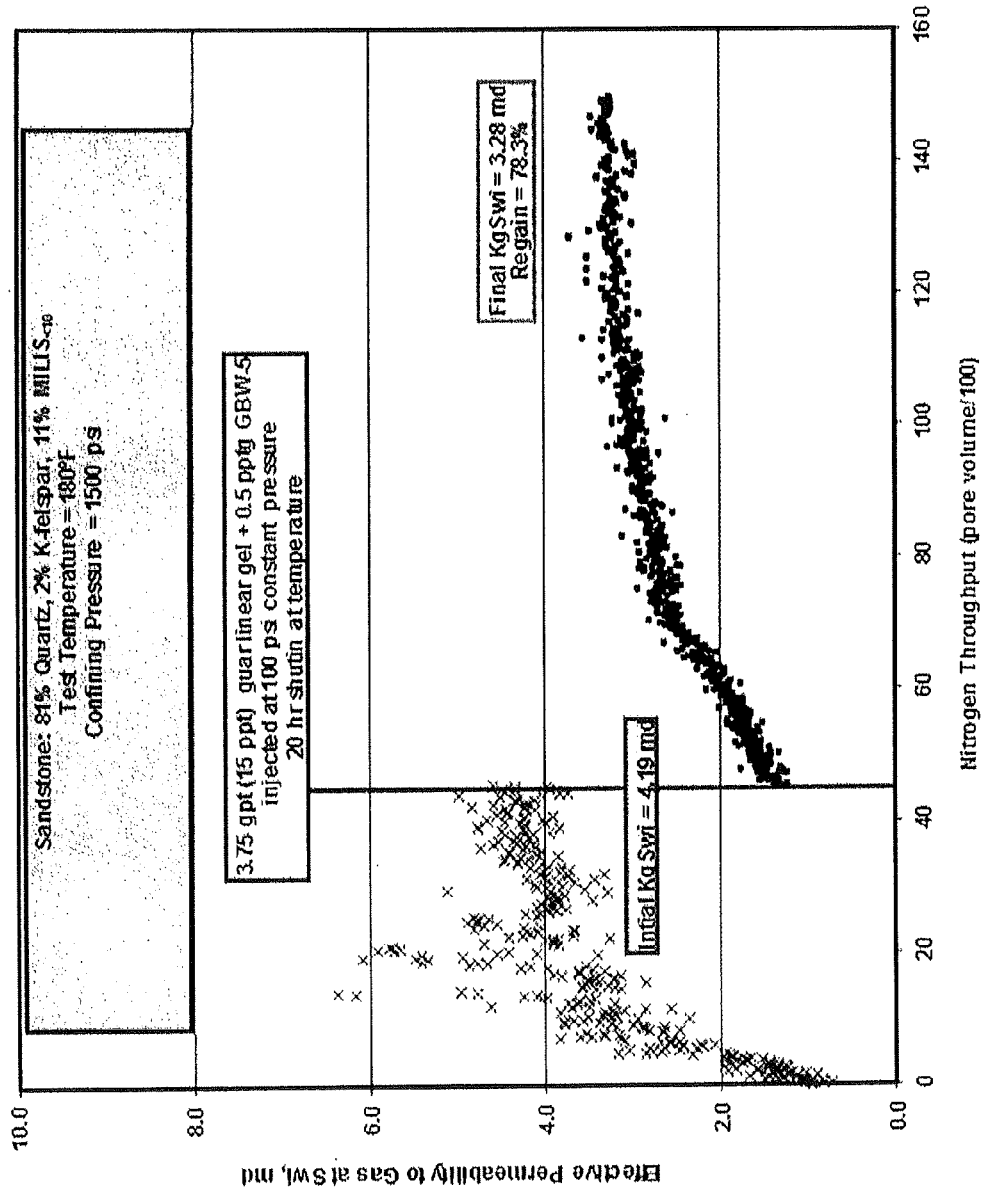
FIG. 4 is a graph depicting the effective permeability of a simulated fracture surface when contacted with a comparative fracturing fluid that contains the guar.

FIG. 3 shows the permeability for the fracturing fluid containing the synthetic polymer disclosed herein, i.e., the MaxPerm-20®. From the FIG. 3, it may be seen that the permeability regained after removal of the fracturing fluid is 92%. FIG. 4 shows the permeability for the fracturing fluid containing the linear guar. From the FIG. 4, it may be seen that the permeability regained after removal of the fracturing fluid is 78.3%.

In comparing the FIGS. 3 and 4, it may be seen that there is substantially less residue left in the simulated fracture surface using the MaxPerm-20® especially when compared with the guar. The synthetic polymer can thus be used to produce a fracturing fluid that produces fewer detrimental effects on fracture surfaces than other naturally occurring polymers such as guar.

From the results seen in the Examples 1, 2 and 3, it may be seen that the synthetic polymer disclosed herein can rapidly dissolve in an aqueous carrier fluid after breaking, and produces less formation damage than other polymers such as, for example guar. The fracturing fluids that contain the synthetic polymer therefore provide an effective and economical alternative to guar-based fracturing fluids, demonstrate fast hydration with almost an instantaneous increase in viscosity following hydration, allows for rapid and easy adjustments of fluid viscosity and for switching the polymers used to produce the viscosity increasing additive, protect well fracturing equipment and leave little to no formation damage upon being activated and decomposed with a commercially available oilfield breaking agent.

Example 4

This example was conducted to show the apparent viscosity versus time and temperature for a fracturing fluid that contains the synthetic polymer, a crosslinking agent and an oxidizing agent. In this example, the apparent viscosity in centipoises (cP) of the fracturing fluid was measured versus time and temperature. The polymer is the MaxPerm-20® synthetic polymer and comprises a polyacrylamide. The carrier fluid is water. The crosslinker is zirconium methyl n-glycinate and zirconium acetyl acetonate. The oxidizing agent is sodium bromate, a commercially available oilfield breaking agent.

Figure 5:
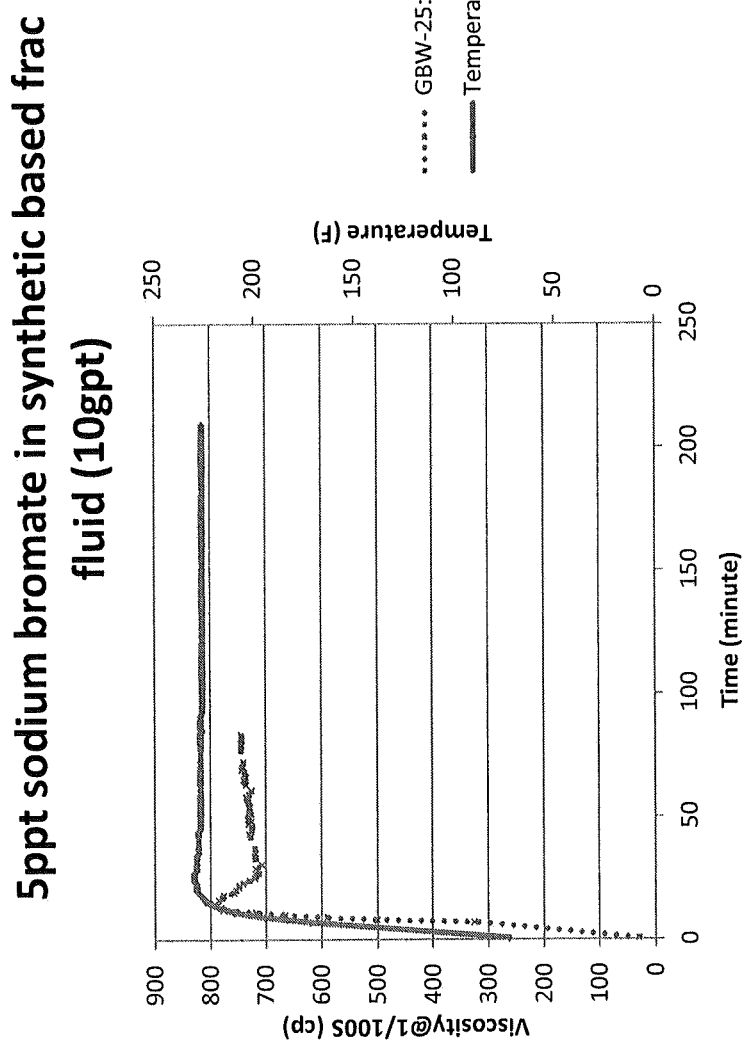
FIG. 5 is a graph depicting the apparent viscosity versus time and temperature for a fracturing fluid that contains the synthetic polymer and an oxidizing agent.

For this example, 10 gallons per thousand gallons (gpt) of the MaxPerm-20® synthetic polymer was dissolved in a water carrier fluid to form the fracturing fluid. The synthetic polymer was allowed to hydrate in the carrier fluid for about 30 minutes. 5 pounds per thousand (ppt) of a sodium bromate oxidizing agent was added to the fracturing fluid. The apparent viscosity at 100 revolutions per minute (rpm) was measured at a temperature of 225° F. (107.22° C.) using a Chandler viscometer (Model No. 5550) with a R1B5 bob and cup configuration against time in minutes according to API RP-39, Section 4.2.6. The viscosity results are provided in FIG. 5. FIG. 5 is a graph of the viscosity (in centipoise) measured at 100 s$^{-1}$ versus time (in minutes) at a temperature of 225° F.

From FIG. 5, it may be seen that introduction of the sodium bromate oxidizing agent incompletely breaks or decomposes the synthetic polymer in the fracturing fluid. For example, the apparent viscosity of the fracturing fluid is about 800 cP at about 20 minutes. The apparent viscosity decreases to about 700 cP at about 30 minutes. At about 100 minutes, the apparent viscosity increases to about 740 cP and exhibits a stable viscosity. The fracturing fluid containing the synthetic polymer demonstrates only partial or incomplete breaking demonstrating a reduction in viscosity of only about 60 cP over time at a temperature of about 225° F. Thus, the sodium bromate oxidizing agent exhibits a low decomposition potential for the crosslinked synthetic polymer at a temperature of about 225° F.

Example 5

Figure 6:
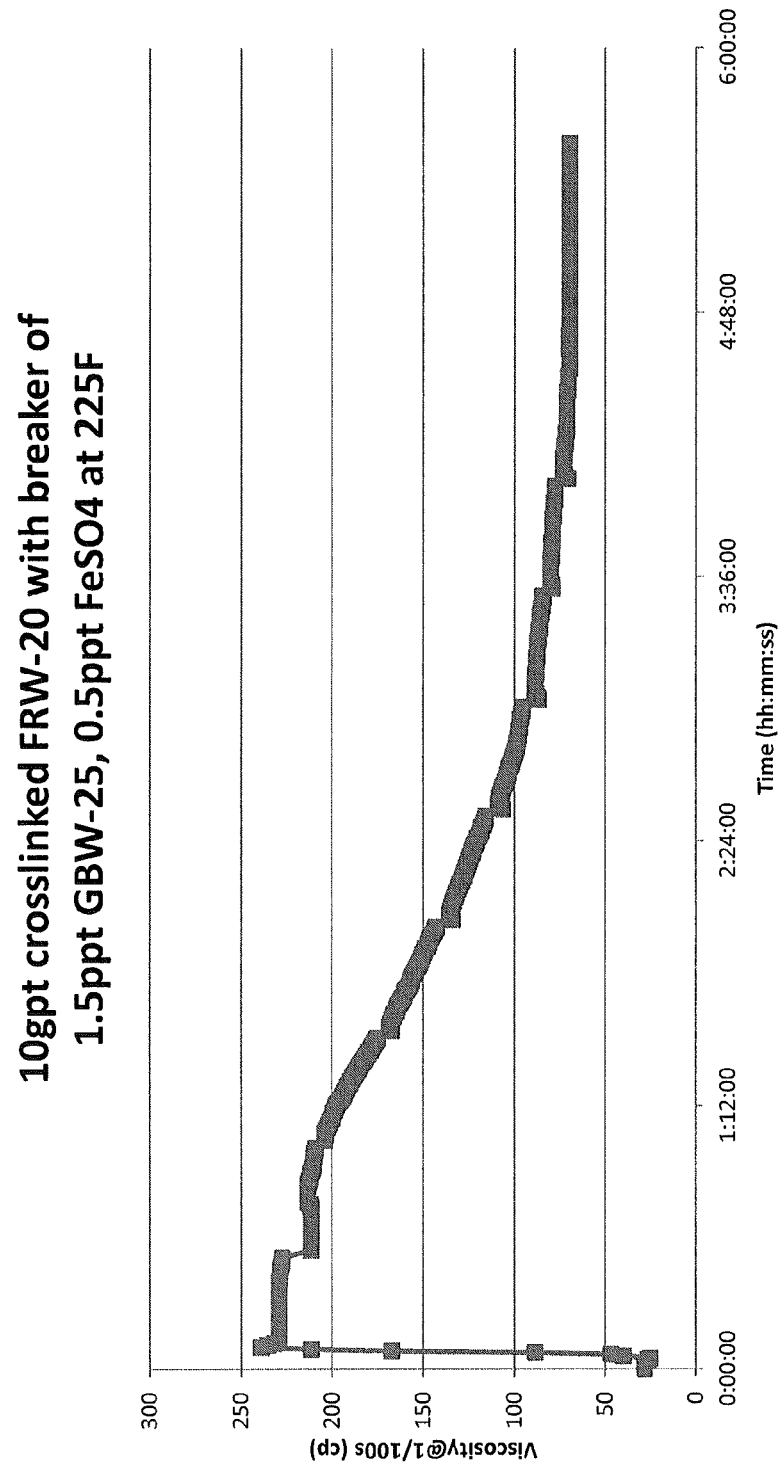
FIG. 6 is a graph depicting the apparent viscosity versus time and temperature for a fracturing fluid that contains the synthetic polymer, an oxidizing agent and a reducing agent.

This example was conducted to show the apparent viscosity versus time and temperature for a fracturing fluid that contains the synthetic polymer, an oxidizing agent and a reducing agent. The reducing agent is iron sulfate. The fracturing fluid contained about 10 gpt of the synthetic polymer, about 1.5 ppt sodium bromate and 0.5 ppt iron sulfate. The crosslinker is zirconium methyl n-glycinate and zirconium acetyl acetonate. The carrier fluid is water. The apparent viscosity in centipoises (cP) of the fracturing fluid was measured versus time and temperature according to Example 4. These results are provided in FIG. 6. FIG. 6 is a graph of the viscosity (in centipoise) measured at 100 revolutions per minute (rpm) versus time (in minutes) at a temperature of 225° F. for the fracturing fluid of Example 5.

From FIG. 6 it may be seen that the addition of the iron sulfate reducing agent to a fracturing fluid that contains the synthetic polymer, water carrier fluid and sodium bromate oxidizing agent results in increased decomposition, or more complete breaking, of the synthetic polymer in the fracturing fluid in comparison to the fracturing fluid of Example 4. The fracturing fluid demonstrates a reduction in viscosity from about 240 cP to about 210 cP after about 30 minutes, and rapidly decreases thereafter to about 70 cP at about 3 hours. Thus, the fracturing fluid containing the synthetic polymer, the water carrier fluid, the sodium bromate oxidizing agent and the iron sulfate oxidizing agent exhibits a higher oxidation potential for the crosslinked synthetic polymer at a temperature of about 225° F. in comparison to the fracturing fluid of Example 4.

In addition, when Example 5 is compared with Example 4, it may be seen that the amount of sodium bromate oxidizing agent used to facilitate complete breaking of the fracturing fluid is significantly less than that used to achieve the incomplete breaking demonstrated in Example 4, from 5 ppt to about 1.5 ppt, while a small amount, 0.5 ppt, of iron sulfate was added in Example 5.

Example 6

This example was conducted to show the apparent viscosity versus time and temperature for fracturing fluids that contain the synthetic polymer, the carrier fluid, the oxidizing agent and the reducing agent as well as a breaker catalyst, a clay control agent, a buffer and crosslinking agents. The polymer used in this example is the MaxPerm-20® synthetic polymer. The carrier fluid is water. The oxidizing agent is sodium bromate. The reducing agent is iron sulfate. The buffer is acetic acid. The clay control agent is tetramethyl ammonium chloride. The crosslinking agents are zirconium methyl n-glycinate and zirconium acetyl acetonate. The breaker catalyst is acetyl triethyl citrate. The respective samples contain different amounts of the sodium bromate reducing agent, as shown in Table 2. Each sample contained 10 gpt MaxPerm-20; 0.3 gpt acetic acid; 1 gpt tetramethyl ammonium chloride; 1 gpt zirconium methyl n-glycinate, 2 ppt zirconium zirconium acetyl acetonate; 1 gpt acetyl triethyl citrate and 0.5 ppt iron (II) sulfate. The pH of each of the fracturing fluid samples 6-9 was 5.40, 5.55, 5.60 and 5.30, respectively.

Figure 7:
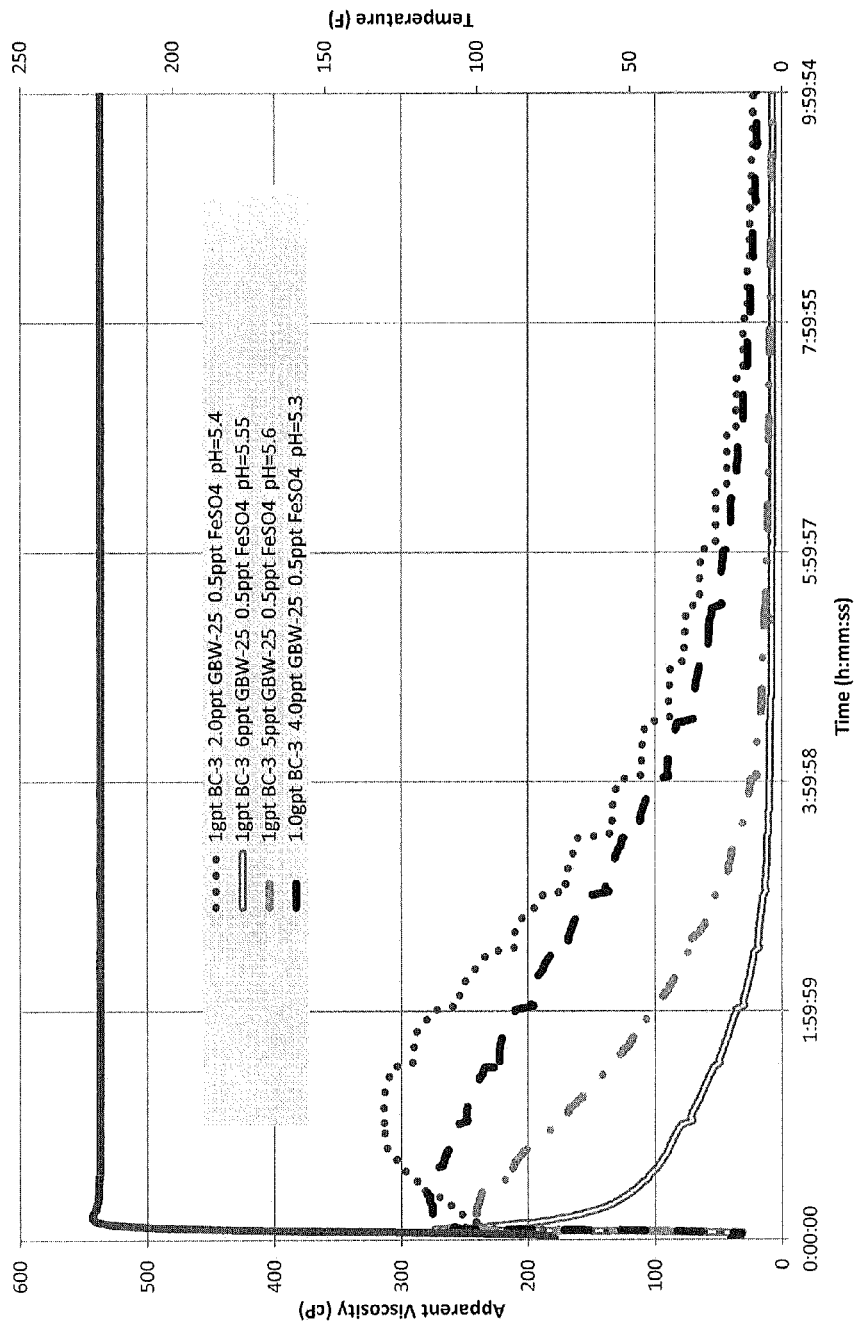
FIG. 7 is a graph depicting the apparent viscosity versus time and temperature for fracturing fluids that contain the synthetic polymer, an oxidizing agent, a reducing agent, a carrier fluid, a clay control agent and crosslinking agents.

The apparent viscosity in centipoises (cP) of the fracturing fluid was measured versus time and temperature according to Example 4. These results are provided in Table 2 and FIG. 7. FIG. 7 is a graph of the viscosity (in centipoise) measured at 100 revolutions per minute (rpm) versus time (in minutes) at a temperature of 225° F. for the respective samples.

In Table 2, Samples 6-9 contain 2.0 ppt, 4.0 ppt, 5.0 ppt and 6.0 ppt of the sodium bromate oxidizing agent, respectively. Each of samples 6-9 also contains 0.5 ppt of the iron sulfate reducing agent. From Table 2 and FIG. 7, it may be seen that the rate of oxidation may be controlled by varying the amount of the oxidizing agent used in combination with the reducing agent in the fracturing fluid.

TABLE 2

| Sample # | Oxidizing Agent | Viscosity (cP) at 0 hr | Viscosity (cP) at 1 hr | Viscosity (cP) at 2 hr | Viscosity (cP) at 4 hr | Viscosity (cP) at 6 hr |
|---|---|---|---|---|---|---|
| 6 | 2.0 ppt sodium bromate | 250 | 310 | 250 | 120 | 60 |
| 7 | 4.0 ppt sodium bromate | 250 | 250 | 200 | 100 | 50 |
| 8 | 5.0 ppt sodium bromate | 250 | 190 | 100 | 25 | 1 |
| 9 | 6.0 ppt sodium bromate | 250 | 75 | 40 | 10 | 1 |

For example, in comparing Sample #6 with Sample #7, it may be seen that a concentration of 2.0 ppt of the sodium bromate oxidizing agent in combination with 0.5 ppt of the iron sulfate reducing agent results in an increase in viscosity of from 250 cP to 310 cP after one hour, while 4.0 ppt of the sodium bromate oxidizing agent in combination with 0.5 ppt of the iron sulfate reducing agent results in a viscosity of about 250 cP after one hour. As shown in FIG. 7, while Sample #6 and #7 both demonstrate an initial increase in viscosity, Sample #7 demonstrates a significantly reduced initial increase in viscosity in comparison to Sample #6. Sample #7 also demonstrates a significantly reduced duration of time before the viscosity begins to decrease, with the decomposition, or breaking, of the synthetic polymer being exhibited after about 30 minutes for Sample #7 in comparison to over one hour for Sample #6.

In addition, it may be seen that Sample #8, containing 5 ppt of the oxidizing agent, in combination with the reducing agent, demonstrates the breaking or decomposition of the synthetic polymer in the fracturing fluid without an initial increase in viscosity. Furthermore, in comparing Sample #8 with Sample #9, it may be seen that a concentration of 6.0 ppt of the oxidizing agent, in combination with the reducing agent, demonstrates the breaking or decomposition of the synthetic polymer in the fracturing fluid almost immediately and without an initial increase in viscosity. Thus, the rate of oxidation may be controlled by selecting the particular amounts of oxidizing agent and reducing agent used in combination with the synthetic polymer in the fracturing fluid.

From the results seen in Examples 4-6, it may be seen that the addition of a relatively small amount of a reducing agent to the oxidizing agent will facilitate the complete breaking or decomposition of the synthetic polymer in the fracturing fluid at lower application temperatures. Fracturing fluids that contain the reducing agent, in addition to the synthetic polymer and the oxidizing agent, therefore demonstrate that complete or nearly complete breaking, or decomposition of the synthetic polymer can be achieved with a commercially available oilfield oxidizing agent and allow for control of and rapid and easy adjustments to the oxidation rate of the synthetic polymer and the fluid viscosity of the fracturing fluid throughout the period of decomposition.

The fracturing fluid may be used in a stimulation treatment, a fracturing treatment, an acidizing treatment, a friction reducing operation or a downhole completion operation. The fracturing fluid can be used as a gel or a slurry or a combination of at least one of the foregoing.

This invention may be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As used herein, the term "fracturing operation" shall include a stimulation treatment, a fracturing treatment, an acidizing treatment, a friction reducing operation or a completion operation, downhole, or the like.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The transition term "comprising" is inclusive of the transition terms "consisting of" and "consisting essentially of".

All numerical ranges included herein are interchangeable and are inclusive of end points and all numerical values that lie between the endpoints.

As used herein a "borehole" may be any type of well, including, but not limited to, a producing well, a non-producing well, an experimental well, an exploratory well, a well for storage or sequestration, and the like. Boreholes may be vertical, horizontal, some angle between vertical and horizontal, diverted or non-diverted, and combinations thereof, for example a vertical borehole with a non-vertical component.

The terms "decompose", "decomposition" and/or "degradable" refer to the conversion of materials into smaller components, intermediates, or end products.

The term and/or is used herein to mean both "and" as well as "or". For example, "A and/or B" is construed to mean A, B or A and B.

As used herein, the term "treatment" or "treating" refers to any hydrocarbon-bearing formation operation that uses a fluid in conjunction with a desired function or purpose. The term "treatment" or "treating" does not imply any particular action by the fluid or any particular constituent thereof.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for treating a hydrocarbon-bearing formation comprising:
blending a carrier fluid with a synthetic polymer and an oxidizing agent to form a fracturing fluid, the synthetic polymer being a polyacrylamide further comprising a labile group or a polyacrylate further comprising a labile group, the labile group comprising ester groups, carbonate groups, azo groups, disulfide groups, orthoester groups, acetal groups, etherester groups, ether groups, silyl groups, phosphazine groups, urethane groups, etheramide groups, anhydride groups, or a combination thereof; the oxidizing agent and the labile group being selected such that the oxidizing agent is effective to activate the labile group and the activated labile group facilitates the decomposition of the synthetic polymer;
injecting the fracturing fluid into the hydrocarbon-bearing formation, the fracturing fluid having a viscosity of about 5 to about 50 centipoise during injection;
discharging the fracturing fluid into a downhole fracture in the hydrocarbon-bearing formation, wherein the fracturing fluid is operative to reduce friction during a hydrocarbon-bearing treatment operation;
activating the labile group on the synthetic polymer with the oxidizing agent;
decomposing the synthetic polymer upon activation of the labile group to provide a decomposed polymer; and
removing the decomposed polymer from the hydrocarbon-bearing formation,
wherein the synthetic polymer is devoid of guar.

2. The method of claim 1, further comprising adding a reducing agent to the fracturing fluid.

3. The method of claim 2, wherein the reducing agent is sodium erythorbate, iron sulfate, oxalic acid, formic acid, ascorbic acid, erythorbic acid, a compound comprising a metal ion wherein the metal ion is a copper ion, an iron ion, a tin ion, a manganese ion or a sulfur ion, or a combination comprising at least one of the foregoing.

4. The method of claim 2, wherein the weight ratio of the oxidizing agent to the reducing agent is about 0.1:1 to about 100:1.

5. The method of claim 2, wherein the oxidizing agent is present in an amount from about 0.001 wt % to about 0.5 wt %, based on the total weight of the fracturing fluid, and the reducing agent is present in an amount from about 0.0006 wt % to about 0.12 wt %, based on the total weight of the fracturing fluid.

6. The method of claim 2, wherein the oxidizing agent is present in an amount of about 0.02 wt. % to about 0.12 wt. %, the reducing agent is present in an amount of about 0.002 wt. % to about 0.012 wt. %, each based on the total weight of the fracturing fluid; and the weight ratio of the oxidizing agent to the reducing agent is about 1:1 to about 20:1.

7. The method of claim 2, wherein the reducing agent is iron sulfate.

8. The method of claim 1, further comprising adding a crosslinking agent to the fracturing fluid.

9. The method of claim 1, wherein the oxidizing agent is an earth metal alkali oxidizing compound, a bromate oxidizing compound, or a combination comprising at least one of the foregoing.

10. The method of claim 1, wherein the synthetic polymer is the polyacrylamide further comprising the labile group.

11. The method of claim 1, wherein upon activation of the labile group, the viscosity of the fracturing fluid is reduced to 2 centipoise or less.

12. The method of claim 1, wherein the fracturing fluid is free of a crosslinking agent.

13. The method of claim 1, wherein the fracturing fluid is free of a naturally occurring polymer.

14. The method of claim 1, wherein the synthetic polymer has a number average molecular weight of about 2,000,000 to about 20,000,000 grams per mole.

15. The method of claim 1, wherein the synthetic polymer is present in an amount of about 0.1 wt % to about 10 wt %, based on the total weight of the fracturing fluid.

16. The method of claim 1, wherein the fracturing fluid further comprises a clay control agent or a breaker catalyst.

17. The method of claim 1, wherein the oxidizing agent is sodium bromate, potassium bromate, or a combination comprising at least one of the foregoing.

18. The method of claim 1, wherein the fracturing fluid further comprises acetyl triethyl citrate.

19. The method of claim 18, wherein the acetyl triethyl citrate is included in the fracturing fluid in an amount of from about 0.0011 wt % to about 1.1 wt %, based on the total weight of the fracturing fluid.

20. A method for treating a hydrocarbon-bearing formation comprising:
blending a carrier fluid with a synthetic polymer, an oxidizing agent, and a reducing agent to form a fracturing fluid, the synthetic polymer being a polyacrylamide copolymer further comprising a labile group or a polyacrylate copolymer further comprising a labile group, the labile group comprising ester groups, amide groups, carbonate groups, azo groups, disulfide groups, orthoester groups, acetal groups, etherester groups, ether groups, silyl groups, phosphazine groups, urethane groups, etheramide groups, anhydride groups, or a combination thereof; the oxidizing agent and the labile group being selected such that the oxidizing agent is effective to activate the labile group and the activated labile group facilitates the decomposition of the synthetic polymer;
injecting the fracturing fluid into the hydrocarbon-bearing formation, the fracturing fluid having a viscosity of about 5 to about 50 centipoise during injection;
discharging the fracturing fluid into a downhole fracture in the hydrocarbon-bearing formation, wherein the fracturing fluid is operative to reduce friction during a hydrocarbon-bearing treatment operation;
activating the labile group on the synthetic polymer with the oxidizing agent; wherein upon activation of the labile group, the viscosity of the fracturing fluid is reduced to 2 centipoise or less;

decomposing the synthetic polymer upon activation of the labile group to provide a decomposed polymer; and removing the decomposed polymer from the hydrocarbon-bearing formation, wherein the synthetic polymer is present in an amount of about 0.1 wt. % to about 10 wt. %, the oxidizing agent is present in an amount of about 0.02 wt. % to about 0.12 wt. %, and the reducing agent is present in an amount of about 0.002 wt. % to about 0.012 wt. %, each based on the total weight of the fracturing fluid; and the weight ratio of the oxidizing agent to the reducing agent is about 4:1 to about 12:1.

21. The method of claim 20, wherein the carrier fluid is slickwater.

22. The method of claim 20, wherein the fracturing fluid further comprises acetyl triethyl citrate in an amount of from about 0.011 wt % to about 0.55 wt %, based on the total weight of the fracturing fluid.

23. The method of claim 20, wherein the fracturing fluid reaches its maximum viscosity within 10 to 40 seconds after introduction of the synthetic polymer into the carrier fluid.

\* \* \* \* \*